US012785015B2

(12) United States Patent
Hofsaess

(10) Patent No.: US 12,785,015 B2
(45) Date of Patent: Nov. 3, 2026

(54) TEMPERATURE-DEPENDENT SWITCHING MECHANISM AND TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 198 days.

(21) Appl. No.: 18/427,728

(22) Filed: Jan. 30, 2024

(65) Prior Publication Data

US 2024/0258054 A1 Aug. 1, 2024

(30) Foreign Application Priority Data

Jan. 31, 2023 (DE) ..................... 10 2023 102 304.7

(51) Int. Cl.
*H01H 37/54* (2006.01)

(52) U.S. Cl.
CPC . *H01H 37/5427* (2013.01); *H01H 2037/5463* (2013.01)

(58) Field of Classification Search
CPC ....... H01H 37/5427; H01H 2037/5463; H01H 37/06; H01H 2037/5454; H01H 37/04; H01H 37/52; H01H 37/64
See application file for complete search history.

(56) References Cited

U.S. PATENT DOCUMENTS 2,861,151 A 11/1958 Moore
4,306,211 A 12/1981 Hofsaess
5,745,022 A * 4/1998 Becher .................. H01H 1/504 337/377
5,757,261 A * 5/1998 Becher ............... H01H 11/0006 337/380
5,867,085 A 2/1999 Kruck
6,005,469 A * 12/1999 Kalapodis ............ H01H 37/323 337/140
6,249,210 B1 * 6/2001 Hofsass ............. H01H 37/5418 337/365
6,724,293 B1 * 4/2004 Hofsass ................. H01H 37/04 337/380
10,256,061 B2 4/2019 Neumann
2011/0140827 A1 * 6/2011 Suzuki ............... H01H 37/5418 337/362

(Continued)

FOREIGN PATENT DOCUMENTS

DE 2917482 A1 11/1980
DE 19919648 A1 12/2000

(Continued)

OTHER PUBLICATIONS

Search report issued by the European Patent Office for application 24152794.4 on Jun. 10, 2024.

(Continued)

*Primary Examiner* — Stephen S Sul
(74) *Attorney, Agent, or Firm* — Reising Ethington P.C.

(57) ABSTRACT

A temperature-dependent switching mechanism for a temperature-dependent switch having a temperature-dependent bimetal disc; a temperature-independent spring disc; an electrically conductive contacting part on which the bimetal disc and the spring disc are captively held; and a retaining ring which has a main body that is made of an electrically conductive material and surrounds a peripheral edge of the spring disc and, as a result, captively holds the spring disc.

15 Claims, 3 Drawing Sheets

(56) References Cited

U.S. PATENT DOCUMENTS

| | | | | |
|---|---|---|---|---|
| 2013/0127585 | A1 | 5/2013 | Hofsaess | |
| 2014/0168844 | A1* | 6/2014 | Liehr | H01H 9/541 361/103 |
| 2015/0061818 | A1* | 3/2015 | Klaschewski | H01H 37/5427 337/343 |
| 2015/0109092 | A1 | 4/2015 | Neumann | |
| 2015/0364284 | A1* | 12/2015 | Mitschele | H01H 1/58 337/111 |
| 2021/0090833 | A1* | 3/2021 | Hofsaess | H01H 37/5409 |
| 2021/0090834 | A1 | 3/2021 | Hofsaess | |

FOREIGN PATENT DOCUMENTS

| | | | |
|---|---|---|---|
| DE | 102007014237 | A1 | 9/2008 |
| DE | 102011119632 | B3 | 4/2013 |
| DE | 102013102089 | A1 | 9/2014 |
| DE | 102013017232 | A1 | 4/2015 |
| JP | 2016096119 | A | 5/2016 |

OTHER PUBLICATIONS

Examination report issued by the Japanese Patent Office for application 2024-012304 on Feb. 4, 2025; English Translation included.

* cited by examiner

TEMPERATURE-DEPENDENT SWITCHING MECHANISM AND TEMPERATURE-DEPENDENT SWITCH

CROSS-REFERENCE TO RELATED APPLICATIONS

This application claims priority from German patent application DE 10 2023 102 304.7, filed on Jan. 31, 2023. The entire content of this priority application is incorporated herein by reference.

FIELD

This disclosure relates to a temperature-dependent switching mechanism for a temperature-dependent switch. The disclosure further relates to a temperature-dependent switch comprising such a temperature-dependent switching mechanism.

BACKGROUND

An exemplary temperature-dependent switch is disclosed in DE 10 2013 102 089 A1.

In a manner known per se, temperature-dependent switches of this type serve for monitoring the temperature of an apparatus. For this purpose, the switch, for example by way of one its external surfaces, is brought into thermal contact with the apparatus to be protected in such a way that the temperature of the apparatus to be protected influences the temperature of the switching mechanism arranged in the interior of the switch.

Typically, the switch herein is electrically arranged in series in the supply current circuit of the apparatus to be protected via connection lines, so that the supply current of the apparatus to be protected flows through the switch when the temperature is below the response temperature of the switch.

In the switches disclosed in DE 10 2013 102 089 A1, the switching mechanism is arranged in the interior of the switch housing. The switch housing is of a two-part construction. It has a lower part made of an electrically conductive material (e.g. metal), which is fixedly connected to a cover part likewise made of an electrically conductive material (e.g. metal) while using an intervening insulation film/foil. The temperature-dependent switching mechanism arranged in the switch housing has a spring disc to which is fastened a movable contacting part, as well as a bimetal disc which is inserted over the movable contacting part. The spring disc presses the movable contact part against a stationary mating contact which on the inside of the switch housing is arranged on the cover part. The spring disc, by way of its outer edge, is supported in the lower part of the switch housing in such a way that the electric current flows from the lower part through the spring disc and the movable contacting part into the stationary mating contact, and from the latter into the cover part.

The responsibility for the temperature-dependent switching behavior of the switch lies substantially with the temperature-dependent bimetal disc. The latter is in most instances designed as a multi-layered, active, sheet-metal like component made of two, three or four components which have dissimilar coefficients of thermal expansion and are connected to one another. The connection of the individual layers of metals or metal alloys in bimetal discs of this type are in most instances material integral or form-fitting, and are achieved by rolling, for example.

A bimetal disc of this type at low temperatures, below the response temperature of the bimetal disc, has a first stable geometric configuration (low-temperature configuration), and at high temperatures, above the response temperature of the bimetal disc, has a second stable geometric configuration (high-temperature configuration). Depending on the temperature, the bimetal disc, in the manner of a hysteresis, jumps from its low-temperature configuration to its high-temperature configuration.

Thus, if the temperature of the bimetal disc, as a result of a temperature increase in the apparatus to be protected, increases beyond the response temperature of the bimetal disc, the latter springs from its low-temperature configuration to its high-temperature configuration. In the process, the bimetal disc works against the spring disc in such a way that the latter lifts the movable contact part from the stationary mating contact in such a way that the switch opens and the apparatus to be protected is switched off and cannot heat up any more.

Unless an anti-resetting device is provided, the bimetal disc springs back to its low-temperature configuration, so that the switch is closed again as soon as the temperature of the bimetal disc drops below the so-called springback temperature of the bimetal disc, as a result of the cooling down of the apparatus to be protected.

In the switch disclosed in DE 10 2013 102 089 A1, the bimetal disc in its low-temperature configuration is mounted without mechanical forces acting thereon in the switch housing, whereby the bimetal disc is also not used for conducting the current. This has the advantage that the bimetal disc has a longer service life, and that the switching point, i.e. the response temperature of the bimetal disc, does not change even after many switching cycles.

Therefore, in a multiplicity of temperature-dependent switches, during production of the switch the bimetal disc is preferably placed in the switch housing as a loose individual part, whereby the bimetal disc, for example by way of a centrical through bore provided therein, is inserted over the contacting part fastened to the spring disc. In this instance, the bimetal part in terms of its position, and its position relative to the other components of the switching mechanism, is fixed only by closing the switch housing. However, the production of a switch of this type, in which the bimetal disc is individually inserted, has proven to be cumbersome because a plurality of steps are required for inserting the switching mechanism into the switch housing.

In a switch disclosed in DE 10 2011 119 632 B3, the bimetal disc is therefore already connected previously (outside the housing) to the contacting part fastened to the spring disc. To this end, the bimetal disc is inserted over the contacting part, and an upper collar of the contacting part is subsequently folded over. Consequently, the spring disc is not only fastened to the contacting part, but the bimetal disc is also captively held on the latter.

The switching mechanism consisting of the bimetal disc, the spring disc and the contacting part can thus be already produced in advance as a semi-finished product which forms a captive unit and can be stored separately as bulk material. During the production of the switch the switching mechanism can then be inserted into the switch housing as a captive unit in only one operative step. This simplifies the production of the switch by many times over.

In the switch disclosed in DE 10 2011 119 632 B3, the spring disc is welded or soldered/brazed to the contacting part so as to ideally establish a good electrical contact between the two components. However, it has been demonstrated that the welded and soldered/brazed connection between the contacting part and the spring disc may break, in particular when the switching mechanism prefabricated as a semi-finished product is stored as bulk material. Switches with defects of this type can then no longer be used. It is particularly problematic here that such a defect can only be detected after the switch has been assembled because functional testing of the switching mechanism is possible only at this point in time.

A temperature-dependent switch is also proposed in DE 199 19 648 A1, the switching mechanism thereof being able to be produced in advance as a semi-finished product. Also in this switching mechanism, the bimetal disc, the spring disc and the contacting part also form a captive unit already prior to being installed in the switch housing, which in its entirety can be inserted into the switch housing during production of the switch and can be stored in advance as bulk material. In this switching mechanism, the contacting part has a casing of a softer metal, and a core from an electrically conducting, harder metal. The bimetal disc and the spring disc are attached to the casing and molded in the softer metal of the casing. However, it has been demonstrated that this type of connection often leads to the bimetal disc and/or the spring disc being inadvertently released from the contacting part during storage of the switching mechanism.

A further possibility of producing the switching mechanism as a semi-finished product in advance is disclosed in DE 29 17 482 A1 and DE 10 2007 014 237 A1. The captive unit of the switching mechanism here is achieved in that the bimetal disc and the spring disc are connected to one another by a rivet. Depending on the construction mode of the switch, this rivet may also form the movable contacting part of the switching mechanism. The rivet is of a two-part construction and has a rivet bolt interacting with a hollow rivet, or a rivet bolt with a mating holder fastened thereto. While this type of rivet connection between the spring disc and the bimetal disc has proved to be a mechanically durable connection, the rivet connection however does cause other disadvantages. In most instances this leads to the bimetal disc being fixedly clamped on the rivet, which may cause deformations and thus malfunctions of the bimetal disc. Overall, storing the switching mechanism in the form of bulk material is thus also possible in principle. However, damage to the switching mechanism during storage of the bulk material can also not be precluded here.

SUMMARY

It is an object to provide a temperature-dependent switching mechanism which is able to be produced in advance as a semi-finished product and be stored as bulk material, without being susceptible to damage that causes a defect in the switching mechanism. The switching mechanism which is able to be produced in advance as a semi-finished product in this instance is also to be able to be used in a simple manner in a temperature-dependent switch, and enable the production of the switching mechanism using as few operative steps as possible. Moreover, the electrical contacting of the switching mechanism by the external terminals of the switch is to be improved.

According to a first aspect, a temperature-dependent switching mechanism is presented, comprising: a temperature-dependent bimetal disc; a temperature-independent spring disc; an electrically conductive contacting part on which the bimetal disc and the spring disc are captively held; and a retaining ring which has a main body that is made of an electrically conductive material and surrounds a peripheral edge of the spring disc and, as a result, captively holds the spring disc.

According to a second aspect, a temperature-dependent switch is presented, comprising a temperature-dependent switching mechanism, a first external terminal, and a second external terminal, wherein the temperature-dependent switching mechanism is configured to switch depending on its temperature between a closed position, in which the temperature-dependent switching mechanism establishes an electrically conductive connection between the first external terminal and the second external terminal, and an open position, in which the temperature-dependent switching mechanism disconnects the electrically conductive connection, and wherein the temperature-dependent switching mechanism comprises: a temperature-dependent bimetal disc; a spring disc; an electrically conductive contacting part on which the temperature-dependent bimetal disc and the spring disc are captively held; and a retaining ring comprising a main body that is made of an electrically conductive material and that surrounds a peripheral edge of the spring disc to captively hold the spring disc The switching mechanism thus comprises an additional retaining ring which as a type of switching mechanism housing circumferentially surrounds the spring disc and captively holds the latter. Since the spring disc and the bimetal disc in turn are also captively held on the electrically conducting contacting part, the mentioned components of the switching mechanism, i.e. the bimetal disc, the spring disc and the contacting part, are all captively held (directly or indirectly) on the retaining ring. In this way, the switching mechanism is producible in advance as a captive unit and suitable for storage as bulk material.

Since the retaining ring surrounds the peripheral edge of the spring disc and captively holds the spring disc, the retaining ring protects the free peripheral edge of the spring disc. This is particularly advantageous during the storage of the switching mechanism as bulk material.

Since the retaining ring is furthermore made of an electrically conductive material (e.g. of metal), the electrical contacting of the switching mechanism can furthermore be simplified by the retaining ring. Specifically, the retaining ring per se can function as an electrical contact.

During production, the temperature-dependent switching mechanism has only to be inserted into a switch housing, and the retaining ring be brought in electrical contact with one of the two external terminals of the switch. In the simplest case, this can be performed by way of a surface contact in which the switching mechanism, conjointly with the retaining ring, is placed onto a contact face arranged in the switch housing.

During the production of a temperature-dependent switch, the switching mechanism, conjointly with the retaining ring, can thus first be produced in advance as a semi-finished product, and then be inserted into a switch housing as an entirety. As a result, not only the storage of the switching mechanism, but also the production of the temperature-dependent switch and the electrical contacting of the switching mechanism, is simplified many times over.

By virtue of the retaining ring, which is now additionally provided on the switching mechanism, the housing of the temperature-dependent switch can be of a significantly simpler construction than to date. In principle, only two external terminals have to be provided on the switch housing, which are electrically connected to one another by way of the switching mechanism.

Therefore, provided is also a temperature-dependent switch which has a temperature-dependent switching mechanism and a switch housing surrounding the switching mechanism, wherein the temperature-dependent switching mechanism, as a function of its temperature, is configured to switch between a closed position in which the switching mechanism establishes an electrically conductive connection between a first external terminal and a second external terminal, and an open position in which the temperature-dependent switching mechanism disconnects the electrically conductive connection.

According to a refinement, the retaining ring does not contact the bimetal disc. Instead, the retaining ring permits a peripheral edge of the bimetal disc to be freely accessible at least from an upper side of the bimetal disc.

The bimetal disc is thus captively held on the retaining ring only indirectly by way of the contacting part, but is not in direct contact with the latter. This has the particular advantage that the peripheral edge of the bimetal disc is freely movable and in the closed position (low-temperature position) of the switch can be mounted without forces acting thereon. The mobility of the bimetal disc is preferably restricted by the retaining ring neither in the closed position nor in the open position of the switch.

According to a further refinement, the retaining ring at least partially surrounds in each case the peripheral edge of the spring disc from a circumferential side of the spring disc, an upper side of the spring disc running transversely to the circumferential side, and a lower side of the spring disc that lies opposite the upper side.

The retaining ring particularly preferably completely surrounds the circumferential side of the spring disc, while only partially surrounding the upper side and lower side of the spring disc, specifically in the region of the peripheral edge of the spring disc. Nevertheless, the retaining ring is of a relatively compact design, so that the retaining ring barely increases the size of the switching mechanism per se in comparison to commercially available temperature-dependent switching mechanisms of this type. Since components on the switch housing can be dispensed with, or the switch housing can be of a simpler construction, respectively, by virtue of the additionally provided retaining ring, as has already been mentioned, the installation size of the entire switch is also not increased by the retaining ring.

According to a further refinement, the peripheral edge of the spring disc is arranged so as to be clamped in the retaining ring.

In this way, the fastening of the spring disc to the retaining ring is quite simple. At the same time, the clamping connection between the retaining ring and the spring disc ensures a mechanically stable cohesion of the switching mechanism unit captively held together by the bimetal disc, the spring disc, the contacting part and the retaining ring.

According to a further refinement, a clamping element is arranged in the main body, and the peripheral edge of the spring disc is arranged between the clamping element and the main body.

The clamping element is preferably an annular clamping element which contacts the peripheral edge of the spring disc along the entire circumference, clamping the peripheral edge between the clamping element and the main body of the retaining ring. There is preferably no high contact pressure caused by the clamping connection generated by the clamping element, but the clamping connection preferably ensures loose clamping of the spring disc (with play), or at least clamping of the spring disc by way of a comparatively low clamping force. Specifically, it is only important that the spring disc is captively held on the retaining ring, and an electrical contact is established between the retaining ring and the spring disc. In contrast, a clamping arrangement with an excessively high clamping force should be avoided so as to avoid deformation of the spring disc.

According to a further refinement, the main body of the retaining ring extends about a central axis and defines a receptacle pocket which is open towards the central axis and in which the clamping element and the peripheral edge of the spring disc are arranged.

This receptacle pocket preferably runs at least along a circumferential portion of the retaining ring. The receptacle pocket thus extends at least partially about the central axis of the main body of the retaining ring. The retaining pocket can also extend completely about the central axis, thus along the entire circumference of the latter.

The receptacle pocket is preferably substantially U-shaped or J-shaped in the cross section. U-shaped means, in particular, that the receptacle pocket, when viewed in the cross section, is formed by two parallel, or substantially parallel, legs which are interconnected by a transverse leg. The two legs which are mutually aligned in parallel, or substantially in parallel, do not mandatorily have to be of identical length (hence also J-shaped). Moreover, this may be an "angular" or "round" U-shaped or J-shaped cross section of the receptacle pocket formed by the main body of the retaining ring.

The receptacle pocket formed by the main body of the retaining ring enables very easy assembling of the switching mechanism. For example, the main body can be bent about the clamping element, and the spring disc can subsequently be arranged between the clamping element and the main body of the retaining ring. Alternatively, the main body can also be produced first, and the clamping element and the spring disc be inserted thereinto conjointly or successively.

The main body of the retaining ring is preferably of a rotationally symmetrical design. The main body of the retaining ring is preferably a rotational solid. The main body is furthermore preferably configured in one piece, i.e. made from an integral component.

While the main body of the retaining ring is made of an electrically conductive material, preferably metal, the clamping element is preferably made of an electrically isolating material, e.g. plastics material.

According to a further refinement, the bimetal disc and the spring disc are arranged on top of one another in a height direction, wherein a height of the contacting part measured in the height direction is greater than a height of the retaining ring measured in the height direction.

The retaining ring is thus of a very flat design, and correspondingly does not, or if at all only to a minor extent, contribute towards increasing the overall height of the switch.

According to a further refinement, the contacting part is arranged so as to be centric relative to the retaining ring and protrudes from the latter at least on a first side.

The retaining ring thus defines a centric through bore about which the main body of the retaining ring extends, and in which the other components of the switching mechanism (bimetal disc, spring disc and contacting part) are arranged. By virtue of the small height of the retaining ring, the contacting part protrudes from the latter on at least a first side, in many cases also on an opposite second side.

The retaining ring thus does not restrict the accessibility of the contacting part in spatial terms. Accordingly, the electrical contacting of the contacting part by the retaining ring is also not restricted. The contacting part is preferably accessible from two opposite sides, thus from its upper side and lower side, and is not surrounded by the retaining ring on these sides.

According to a further refinement, an internal diameter of the main body of the retaining ring is smaller than an external diameter of the spring disc, but greater than an external diameter of the bimetal disc.

This guarantees that the spring disc is captively held on the main body of the retaining ring, while the outer edge of the bimetal disc does not collide with the retaining ring when the bimetal disc moves.

The mentioned internal or external diameters are in each case understood to refer to a dimension of the retaining ring, or of the bimetal disc, or of the spring disc, which is measured transversely, preferably orthogonally, to the height direction.

According to a further refinement, the contacting part has a first component and a second component fastened to the first component, wherein an inner edge of the spring disc, which is arranged to be centric, is clamped between the first and the second component, and wherein an inner edge of the bimetal disc, which is arranged to be centric, is arranged between the second component and the spring disc.

The contacting part is thus preferably constructed in two parts. While the spring disc by way of its inner edge is clamped between the two components of the contacting part, the inner edge of the bimetal disc is arranged between the inner edge of the spring disc and the second component and has some play. This in turn has a positive effect on the service life of the bimetal disc, because the latter can in this way be mounted without forces acting thereon in the closed position of the switch.

As has already been mentioned, the present disclosure relates not only to the temperature-dependent switching mechanism but also to the temperature-dependent switch in which the temperature-dependent switching mechanism is used. It is, therefore, understood that the features of the abovementioned refinements, like the features defined in the dependent claims pertaining to the temperature-dependent switching mechanism, in the same or an equivalent manner also relate to the temperature-dependent switch.

According to a refinement of the temperature-dependent switch, the switch housing has a lower part, and a cover part which is fastened to the lower part and closes the lower part, wherein the lower part and the cover part are made of an electrically isolating material.

For example, the cover part as well as the lower part are in each case made of plastics material. This offers a significant cost advantage in comparison to switch housing components made of metal.

The production of the switch housing from an electrically isolating material is possible inter alia because the retaining ring of the switching mechanism can be produced from an electrically conducting material and can thus function as an electrode of the switch, or of the switching mechanism, respectively. In conventional switching mechanisms which are designed without such a retaining ring, at least one part of the switch housing, or even both parts of the switch housing (the lower part and the cover part), function(s) as electrode(s), so that the corresponding part of the switch housing must be formed from an electrically conductive material.

According to a further refinement, the retaining ring forms a first electrode, wherein the lower part supports the first electrode and a second electrode electrically connected to the second external terminal and holds the two electrodes at a mutual spacing along a height direction, wherein the first electrode is electrically connected to the first external terminal by way of a line connection element which is aligned transversely to the two electrodes and arranged in the lower part, and wherein the first and the second external terminal are led through the lower part at the same height in terms of the height direction.

The line connection element which according to this refinement is provided in the interior of the switch housing and inside the switch electrically connects the retaining ring that functions as the first electrode to the first external terminal makes it possible to route the two external terminals through the lower part at the same height, despite the two electrodes being offset in terms of height in the interior of the switch. The electrical connection of the switch is significantly simplified by the arrangement of the two external terminals at the same height.

The line connection element is preferably a separate component which functions as an electrical lead holder between the first electrode and the first external terminal, and inside the switch is electrically connected to the first electrode, thus the retaining ring, on the one hand, and on the other to the first external terminal. For example, this herein may be a sheet-metal conductor which is arranged in the lower part of the switch housing, and is arranged between the first electrode and the first external terminal.

According to a refinement, the retaining ring bears on the line connection element.

The electrical connection of the switching mechanism is thus managed quite simply in that the switching mechanism is inserted into the lower part of the switch housing in such a manner that the retaining ring bears on the line connection element. A surface contact between the retaining ring and the line connection element is achieved by this bearing action, this resulting in good and sustainable contacting of the switching mechanism.

According to a further refinement, the bimetal disc, as a function of its temperature, is configured to change its shape so as to switch the switching mechanism between the closed position and the open position, and wherein the spring disc in the closed position of the switching mechanism is configured to establish the electrically conductive connection in that the spring disc is supported on the retaining ring and generates a mechanical contact pressure by way of which the contacting part is pressed against a stationary mating contact.

The retaining ring thus serves as the first electrode of the switching mechanism. The stationary mating contact serves as the second electrode of the switching mechanism, or is arranged on the second electrode of the switching mechanism. The current flow in the closed position takes place by way of the retaining ring, the spring disc, the contacting part and the stationary mating contact. In contrast, the bimetal disc is non-energized in the closed position of the switch. This in turn also has a positive effect on the service life of the bimetal disc, and thus the service life of the switching mechanism.

It is understood that the features mentioned above and yet to be discussed hereunder can be used not only in the respective combination set forth, but also in other combinations or individually without departing from the spirit and scope of the present disclosure.

DESCRIPTION OF PREFERRED EMBODIMENTS

Figure 1:
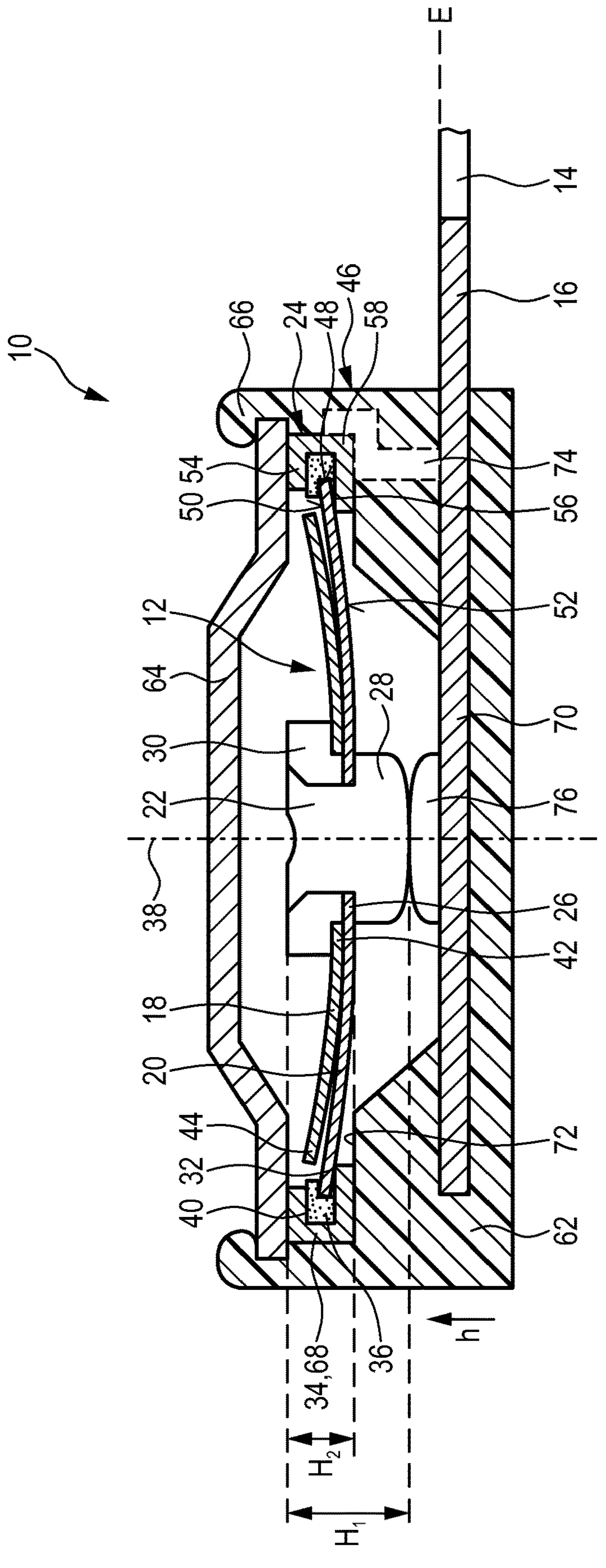
FIG. 1 shows a schematic sectional view of an exemplary embodiment of a temperature-dependent switch comprising a temperature-dependent switching mechanism, wherein the temperature-dependent switching mechanism of the switch is in its closed position.
Figure 2:
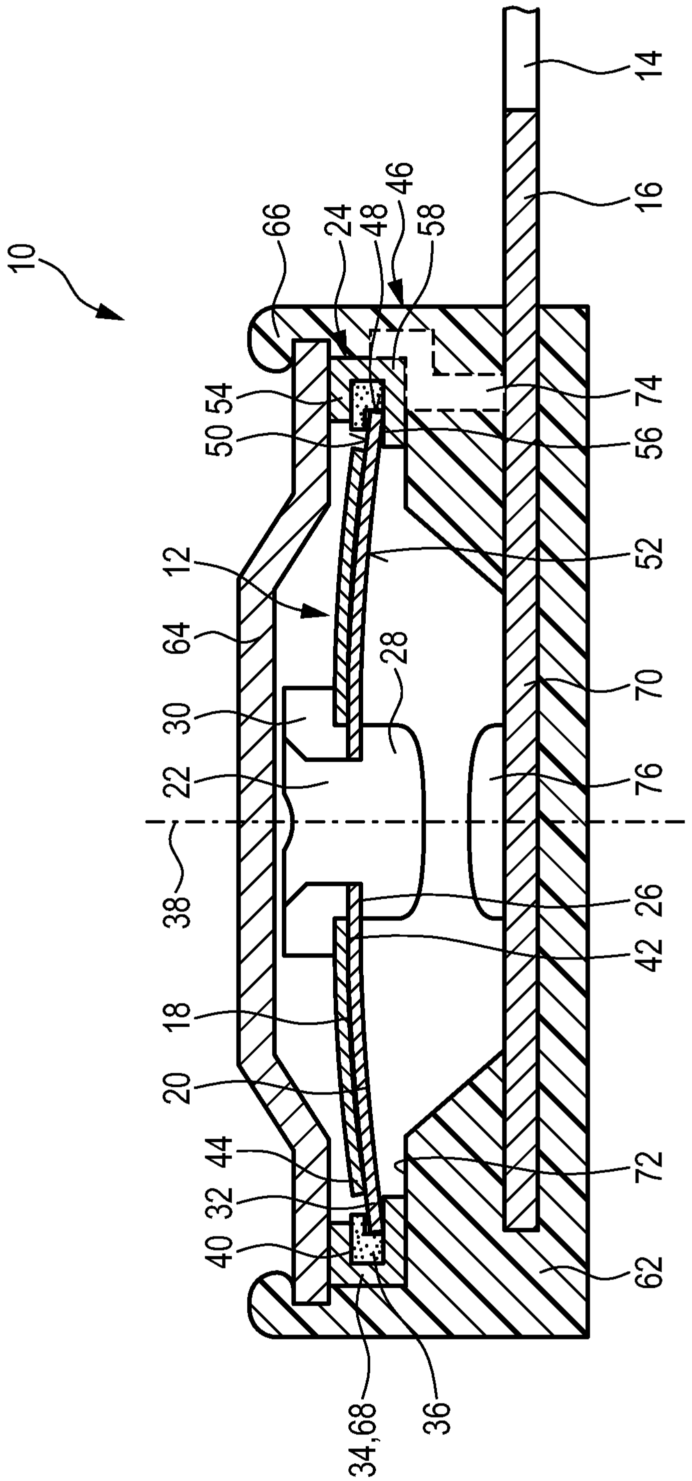
FIG. 2 shows a schematic sectional view of the exemplary embodiment of the switch shown in FIG. 1, wherein the temperature-dependent switching mechanism of the switch is in its open position.

FIGS. 1 and 2 show in each case a schematic sectional view of an exemplary embodiment of a temperature-dependent switch, in which a switching mechanism is used. The switch therein in its entirety is denoted by the reference sign 10.

FIG. 1 shows the closed position of the switch 10. FIG. 2 shows the open position of the switch 10.

The switch 10 has a temperature-dependent switching mechanism 12. The switching mechanism 12, as a function of its temperature, is configured to switch the switch 10 from its closed position to its open position, and vice versa.

In the closed position of the switch 10, shown in FIG. 1, the switching mechanism 12 establishes an electrically conductive connection between the two external terminals 14, 16 of the switch 10. In contrast, in the open position of the switch 10, shown in FIG. 2, the switching mechanism 12 disconnects the electrically conductive connection between the first external terminal 14 and the second external terminal 16.

The temperature-dependent switching mechanism 12 has a temperature-dependent bimetal disc 18, a temperature-independent spring disc 20, a movable contacting part 22 as well as a retaining ring 24. The mentioned components 18-24 of the switching mechanism 12 are captively connected to one another.

The spring disc 20 has a central bore through which the contacting part 22 is guided. The inner edge 26 of the spring disc 20 is fixedly clamped on the contacting part 22. More specifically, the contacting part 22 is of a two-part construction and has a first component 28, which forms the primary body of the contacting part 22, and a second component 30, which is designed as a type of encircling shoulder and is fixedly connected to the first component 28 of the contacting part 22. The spring disc 20 by way of its inner edge 26 is clamped between the first component 28 and the second component 30 of the contacting part 22.

The peripheral edge 32 of the spring disc 20 is captively held on the retaining ring 24. The retaining ring 24 has a main body 34 and a clamping element 36 which is arranged in the main body 34. The main body 34 of the retaining ring 24 is formed from metal or any other electrically conducting material. This main body 34 is a rotationally symmetrical body which extends about a central axis 38 and forms a type of receptacle pocket 40 in which the clamping element 36 and the encircling outer edge 32 of the spring disc 20 are arranged.

As is shown in FIGS. 1 and 2, the receptacle pocket 40 formed by the main body 34 of the retaining ring 24 is open towards the central axis 38 and substantially U-shaped or J-shaped in the cross section. The receptacle pocket 40 formed by the main body 34 of the retaining ring 24 extends at least in portions along the retaining ring 24. The receptacle pocket 40 can, but does not mandatorily have to, extend along the entire circumference of the retaining ring 24, as will be explained in more detail hereunder.

The clamping element 36 is preferably a spacer ring which is designed as a rotational solid and is adapted to the shape of the retaining ring, or the shape of the receptacle pocket 40 formed by the main body 34, respectively. This spacer ring preferably sits in the receptacle pocket 40 with a precise fit. The spacer ring, or the clamping element 36, respectively, is preferably made of an electrically isolating material, e.g. from plastics material.

While the spring disc 20 by way of its peripheral edge 32 is clamped between the main body 34 and the clamping element 36 of the retaining ring 24, and by way of its inner edge 26 is fastened to the contacting part 22 in a clamping manner, the bimetal disc 18 in the closed position of the switching mechanism 12, shown in FIG. 1, is mounted so as to be largely free of forces acting thereon. The bimetal disc 18 by way of its inner edge 42 is arranged between the second component 30 of the contacting part 22 and the spring disc 20, the second component 30 being designed as an encircling shoulder. As a result of this type of arrangement, the bimetal disc 18 is captively held on the contacting part 22, but with play. In the closed position of the switching mechanism 12, the peripheral edge 44 protrudes into the interior of the switch and is in contact neither with the retaining ring 24 nor with the switch housing 46 in which the switching mechanism 12 is arranged. The peripheral edge 44 of the bimetal disc 18 is thus freely accessible at least from the upper side and from this side not obscured by the retaining ring 24.

In contrast, the retaining ring 24 surrounds the peripheral edge 32 of the spring disc 20 from the circumferential side 48 as well as from the upper side 50 and lower side 52 of the spring disc 20.

The bimetal disc 18 and the spring disc 20 are arranged on top of one another in the height direction h. A height H1 of the contacting part 22, measured in the height direction h, is greater than a height H2 of the retaining ring 24 measured in the height direction h. Accordingly, in the closed position of the switching mechanism 12 shown in FIG. 1, the contacting part 22 protrudes downwards from the retaining ring 24. In the closed position shown in FIG. 2, the contacting part 22 protrudes from the retaining ring 24 on both sides (downwards and upwards).

Figure 4:
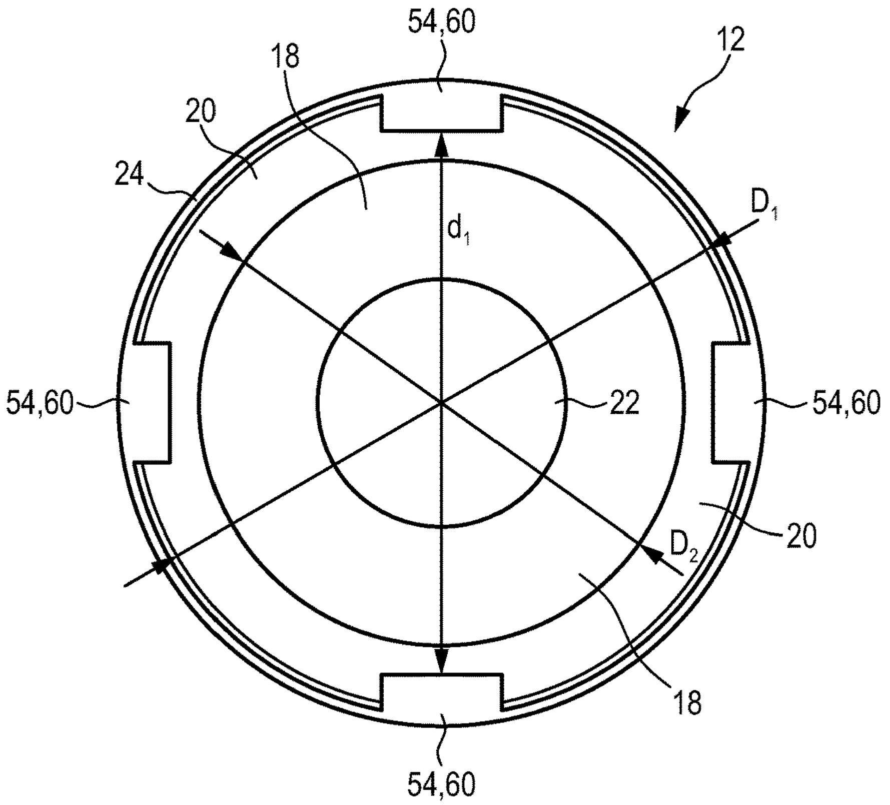
FIG. 4 shows a schematic view from above of the switching mechanism according to an exemplary embodiment.

As is derived from the view from above of the switching mechanism 12 illustrated in FIG. 4, an internal diameter d1 of the main body 34 of the retaining ring 24 is smaller than an external diameter D1 of the spring disc 20, but greater than an external diameter D2 of the bimetal disc 18. It is ensured as a result that the spring disc 20 in turn is captively held on the retaining ring 24 and cannot be inadvertently released from the latter. On the other hand, it is ensured as a result that the bimetal disc 18 does not collide with the retaining ring 24 when the former moves in a temperature-dependent manner.

The main body 34 of the retaining ring 24 is configured in one piece. The main body 34 has a top wall 54, a base wall 56 which is integrally connected to the top wall 54 and runs parallel to the latter, and a side wall 58 which runs transversely to the top wall 54 and the base wall 56. The side wall 58 connects the top wall 54 to the base wall 56 and is integrally connected to both.

While the side wall 58 runs along the entire circumference of the main body 34 of the retaining ring 24, the top wall 54 and the base wall 56 of the main body 34 of the retaining ring 24 do not mandatorily have to run in an encircling manner. It is indeed fundamentally possible that the top wall 54 runs along the entire circumference of the main body 34 of the retaining ring 24. However, for the avoidance of folds being formed, it is advantageous for the top wall 54 of the main body 34 of the retaining ring 24 to have a plurality of separate segments 60 which are folded back and arranged so as to be distributed in the circumferential direction, as is shown in the view from above in FIG. 4.

In the production of the switch 10, the switching mechanism 12 is inserted into the switch housing 46 as an entirety. This switch housing 46 has a lower part 62 which is designed in the manner of a pot and is closed by a cover part 64 that is designed separately from the switch housing 46. The lower part 62 as well as the cover part 64 in the switch are produced from an electrically isolating material, e.g. from plastics material. The upper edge 66 of the lower part 62 is sealed to the cover part in a vacuum-tight manner by compression. For example, in the production of the switch 10 the upper edge 66 of the lower part 62 is radially formed inwards by hot forming in such a way that the lower part 62 is fixedly connected to the cover part 64, and the interior of the switch is sealed in particular so as to protect the switching mechanism 12 against the ingress of moisture or other contaminations invading the interior of the switch.

By virtue of the lower part 62 and the cover part 64 being formed from an electrically isolating material, the switch housing 46 per se does not serve as an electrical connection of the switching mechanism 12. Instead, the main body 34 of the retaining ring 24, which is formed from an electrically conductive material, serves as the first electrode 68. A second electrode 70 is embedded in the lower part 62 of the switch housing 46. This second electrode 70 is integrally connected to the second external terminal 16. The second electrode 70 can be, e.g. a sheet-metal plate which is integrated directly into the lower part 62 of the switch housing 46. For example, in the production of the switch 10, the lower part 62 is produced as a plastic injection-molded part by overmolding the second electrode 70.

The two electrodes 68, 70 of the switching mechanism 12 are mutually spaced apart in the height direction h by the lower part 62 of the switch housing 46. The retaining ring 23 herein bears on top of a shoulder 72 formed in the interior of the lower part, and is simultaneously in planar contact with a line connection element 74 which is electrically connected to the first external terminal 14. This line connection element 74 can be, for example, a sheet-metal conductor or any other electrical conductor which is integrated into the lower part 62 of the switch housing 46.

The line connection element 74 electrically connects the main body 34 of the retaining ring 24, which functions as the first electrode 68 of the switching mechanism 12, to the first external terminal 14. In this way, it is nevertheless possible to route the two external terminals 14, 16 from the inside to the outside through the lower part 62 of the switch housing 46 at the same height, despite the two electrodes 68, 70 being arranged so as to be offset in the height direction h. Accordingly, in the sectional views shown in FIGS. 1 and 2, the first external terminal 14 is arranged "behind" the second external terminal 16, because the first external terminal 14 is arranged at the same height as the second external terminal 16 and runs parallel to the second external terminal 16. The latter can be seen in particular when viewed conjointly with the view from above of the switch 10 shown in FIG. 3.

Figure 3:
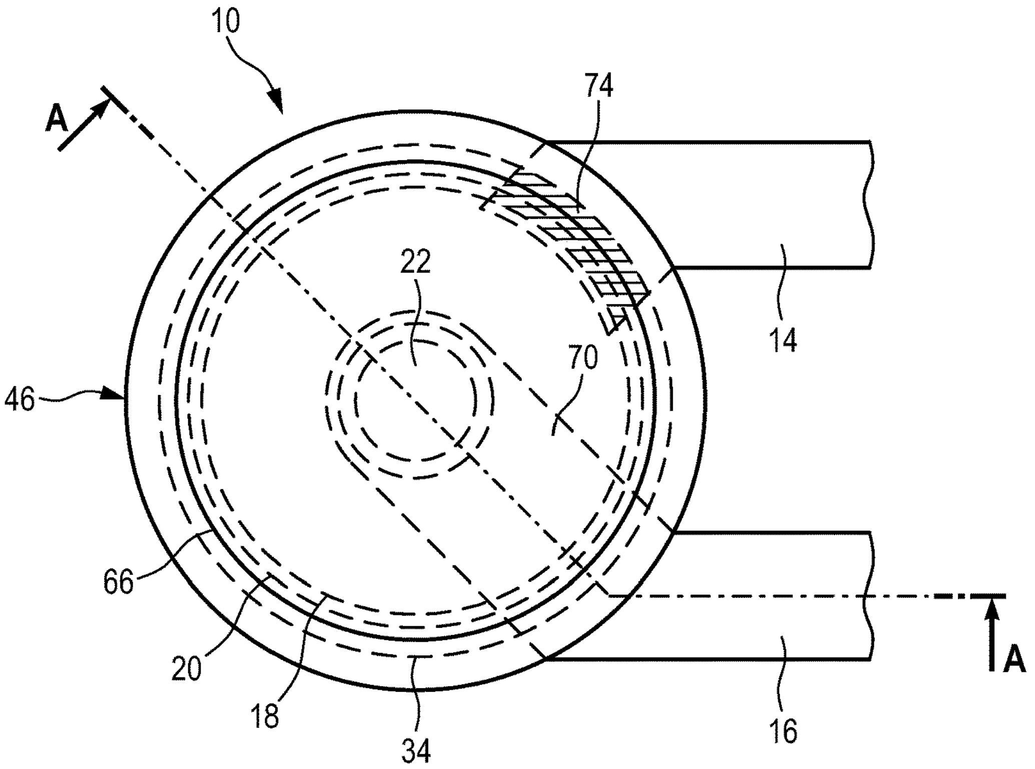
FIG. 3 shows a schematic view from above of the switch illustrated in FIGS. 1 and 2, wherein components in the interior of the switch are illustrated by dashed lines.

As is shown in FIG. 3, the two external terminals 14, 16 run parallel to one another outside the switch housing 46 and, by virtue of the line connection element 74, can be arranged in a common connection plane E which is indicated by a dashed line in FIGS. 1 and 2.

The line connection element 74 furthermore offers the advantage that the switching mechanism 12 in the production of the switch 10 has only to be inserted into the lower part 62, the electrical contact between the main body 34 of the retaining ring 24 and the first external terminal 14 then being automatically established.

It is to be pointed out here that FIG. 3 shows a view from above of the switch 10, wherein some components (e.g. components 18, 20 and 34) which are arranged in the interior of the switch housing 46 are indicated by dashed lines because said components are actually not visible from the outside. The dashed lines indicate in each case the contour, or the external circumference, respectively, of the respective component. The second electrode 70, which is likewise indicated by dashed lines in FIG. 3, runs obliquely, or at an angle, to the second external terminal 16 but, conjointly with the second external terminal 16, lies in the connection plane E, as has already been mentioned. Therefore, FIGS. 1 and 2 show the section along the section line A-A.

It is furthermore understood that the line connection element 74 in the case of a section line A-A of this type, and in the case of its arrangement shown in FIG. 3, would not actually be visible in FIGS. 1 and 2 but would be obscured by parts of the housing lower part 62. However, the views shown in FIGS. 1 and 2 are not true-to-scale and true-to-detail sectional views but schematic sectional views in which the line connection element 74 is schematically illustrated for the purpose of better explaining the arrangement of the latter.

It is moreover understood that the second electrode 70 does not mandatorily have to run at an angle, or obliquely, to the second external terminal 16, as is shown in FIG. 3. In principle, the second electrode 70 can also be co-aligned with the second external terminal 16. In such a case, it is preferable for the second external terminal 16, conjointly with the second electrode 70, to run in the radial direction of the switch housing 46. If the second external terminal 16 is arranged to be centric, thus compared with the position shown in FIG. 3, offset in parallel upwards in the direction of the first external terminal 14, a parallel alignment of the two external terminals 14, 16 is also possible in this instance. With reference to FIG. 3, the second external terminal 16 and the second electrode 70 in this instance will be arranged in the center of the switch housing 46, in a line parallel to the first external terminal 14.

The temperature-dependent switching function of the switch 10, which is caused by the temperature-dependent switching mechanism 12, will be explained hereunder by means of FIGS. 1 and 2.

As has already been mentioned, FIG. 1 shows the closed position of the switch 10, in which the temperature-dependent switching mechanism 12 establishes an electrical contact between the two external terminal 14, 16 in the interior of the switch. In this closed position the spring disc 20 presses the contacting part 22 against a stationary mating contact 76 which is fastened to the second electrode 70. In the closed position of the switch 10, the bimetal disc 18 is non-energized and mounted so as to be free of forces acting thereon. The contact pressure, like the current flow, are caused only by the spring disc 20. To this end, the spring disc 20 by way of its peripheral edge 32 is supported on the clamping element 36, and presses the contact part 22, which is centrally arranged, against the mating contact 76. The current flow takes place from the first external terminal 14 by way of the line connection element 74, the retaining ring 24, the spring disc 20, the movable contacting part 22, the stationary mating contact 76 and the second electrode 70 to the second external terminal 16 (or in the reverse direction).

In the closed position, or low-temperature position, respectively, of the switch 10, shown in FIG. 1, the spring disc 20 is thus in its first configuration, and the bimetal disc 18 is in its low-temperature configuration. If, proceeding from this situation, the temperature of the apparatus to be protected, and thus the temperature of the switch 10 and the temperature of the bimetal disc 18, increase to the response temperature of the bimetal disc 18 or beyond this response temperature, the bimetal disc 18 springs from its convex low-temperature position shown in FIG. 1 to its concave high-temperature position, the latter being shown in FIG. 2. In this springing action, the bimetal disc 18, by way of its outer edge 44, is supported on the spring disc 20. As a result, the spring disc 20 simultaneously bends upwards at its center, so that the spring disc 20 springs from its first stable geometric configuration shown in FIG. 1 to its second geometrically stable configuration shown in FIG. 2. As a result, the contacting part 22 is lifted from the mating contact 76, and the electrically conductive connection between the two external contacts 14, 16 is interrupted.

Accordingly, the apparatus to be protected is de-energized so that it can cool down again. If the temperature subsequently drops back to a temperature below the so-called springback temperature of the bimetal disc 18, the latter springs back from its high-temperature position, shown in FIG. 2, to its low-temperature position, shown in FIG. 1, as a result of which the electrically conductive connection between the two external terminals 14, 16 is closed again. Depending on the specific application, such a reset can be prevented by an anti-reset lock, or a heating resistor which is electrically wired parallel to the switching mechanism 12 and causes a so-called self-maintaining function.

It is understood that various other potential modifications of the exemplary embodiment shown in the drawings are possible in the switch 10, without departing from the spirit and scope of the present disclosure. For example, the switch housing 46 does not at all have to be of a circular design in the longitudinal section, but may also be of an oval or angular design. Accordingly, the two discs 18, 20 likewise do not have to be designed as circular discs. The shape of the retaining ring 24 as well as the shape of the contacting part 22 can likewise be of a somewhat different design and does not mandatorily have to have the exact shape as is illustrated in the drawings presently shown.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switching mechanism for a temperature-dependent switch, comprising:
- a temperature-dependent bimetal disc;
- a spring disc;
- an electrically conductive contacting part on which the temperature-dependent bimetal disc and the spring disc are captively held; and
- a retaining ring comprising a main body that is made of an electrically conductive material and that surrounds a peripheral edge of the spring disc to captively hold the spring disc, wherein the retaining ring does not contact the temperature-dependent bimetal disc, and permits a peripheral edge of the temperature-dependent bimetal disc to be freely accessible at least from an upper side of the temperature-dependent bimetal disc.

2. The temperature-dependent switching mechanism according to claim 1, wherein the retaining ring at least partially surrounds the peripheral edge of the spring disc from a circumferential side of the spring disc, an upper side of the spring disc running transversely to the circumferential side, and a lower side of the spring disc opposite the upper side.

3. The temperature-dependent switching mechanism according to claim 1, wherein the peripheral edge of the spring disc is clamped in the retaining ring.

4. The temperature-dependent switching mechanism according to claim 1, wherein a clamping element is arranged in the main body, and the peripheral edge of the spring disc is arranged between the clamping element and the main body.

5. The temperature-dependent switching mechanism according to claim 4, wherein the main body of the retaining ring extends about a central axis and defines a receptacle pocket which is open towards the central axis and in which the clamping element and the peripheral edge of the spring disc are arranged.

6. The temperature-dependent switching mechanism according to claim 1, wherein the main body is a single integral piece.

7. The temperature-dependent switching mechanism according to claim 1, wherein the temperature-dependent bimetal disc and the spring disc are arranged on top of one another in a height direction, and wherein a height of the electrically conductive contacting part measured in the height direction is larger than a height of the retaining ring measured in the height direction.

8. The temperature-dependent switching mechanism according to claim 1, wherein the electrically conductive contacting part is arranged so as to be centric relative to the retaining ring, and wherein the electrically conductive contacting part protrudes from the retaining ring at least on a first side.

9. The temperature-dependent switching mechanism according to claim 1, wherein an internal diameter of the main body of the retaining ring is smaller than an external diameter of the spring disc but larger than an external diameter of the temperature-dependent bimetal disc, the internal diameter of the main body of the retaining ring, the external diameter of the spring disc, and the external diameter of the temperature-dependent bimetal disc being measured parallel to one another.

10. The temperature-dependent switching mechanism according to claim 1, wherein the temperature-dependent switching mechanism is rotationally symmetrical about a central axis.

11. The temperature-dependent switching mechanism according to claim 10, wherein an internal diameter of the main body of the retaining ring is smaller than an external diameter of the spring disc but larger than an external diameter of the temperature-dependent bimetal disc, the internal diameter of the main body of the retaining ring, the external diameter of the spring disc, and the external diameter of the temperature-dependent bimetal disc being measured parallel to one another and orthogonal to the central axis.

12. A temperature-dependent switch comprising a temperature-dependent switching mechanism, a first external terminal, and a second external terminal, the temperature-dependent switching mechanism is configured to switch depending on its temperature between a closed position, in which the temperature-dependent switching mechanism establishes an electrically conductive connection between the first external terminal and the second external terminal, and an open position, in which the temperature-dependent switching mechanism disconnects the electrically conductive connection, and the temperature-dependent switching mechanism comprises:

a temperature-dependent bimetal disc;

a spring disc;

an electrically conductive contacting part on which the temperature-dependent bimetal disc and the spring disc are captively held; and a retaining ring comprising a main body that is made of an electrically conductive material and that surrounds a peripheral edge of the spring disc to captively hold the spring disc, wherein the retaining ring forms a first electrode, a lower part supports the first electrode and a second electrode and holds the first electrode and the second electrode spaced apart from one another along a height direction, the first electrode is electrically connected to the first external terminal by way of a line connection element that is aligned transversely to the first electrode and the second electrode and that is arranged in the lower part, the second electrode is electrically connected to the second external terminal, and the first external terminal and the second external terminal are led through the lower part in a common connection plane orthogonal to the height direction.

13. The temperature-dependent switch according to claim 12, further comprising a switch housing that comprises the lower part and a cover part, the cover part is fastened to the lower part and closes the lower part, and wherein each of the lower part and the cover part are made of an electrically isolating material.

14. The temperature-dependent switch according to claim 12, wherein the retaining ring bears on the line connection element.

15. The temperature-dependent switch according to claim 13, wherein the temperature-dependent bimetal disc is configured to change its shape depending on its temperature so as to switch the temperature-dependent switching mechanism between the closed position and the open position, and wherein the spring disc in the closed position of the temperature-dependent switching mechanism is configured to establish the electrically conductive connection in which said spring disc is supported on the retaining ring and generates a mechanical contact pressure by way of which the electrically conductive contacting part is pressed against a stationary mating contact.

* * * * *